Jan. 27. 1925.
W. T. SEARS
1,524,528
BORING AND FACING MACHINE
Filed Sept. 23, 1922      2 Sheets-Sheet 2
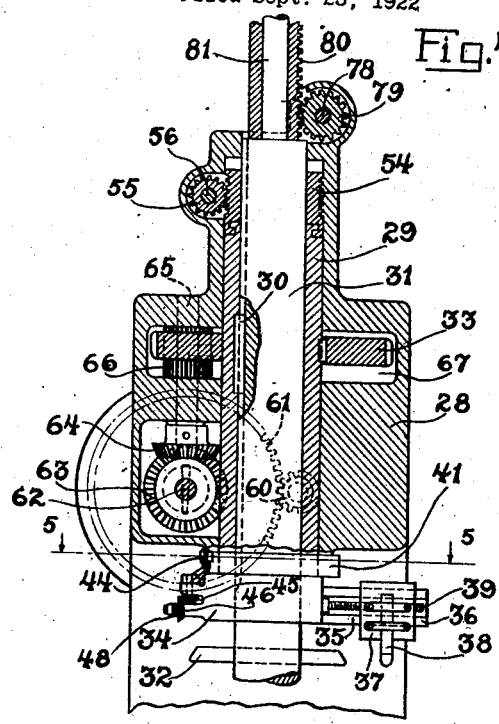
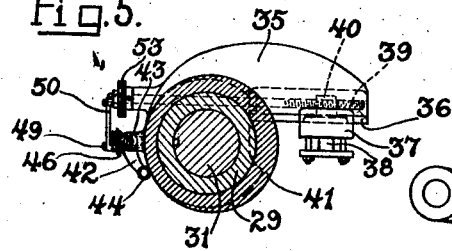
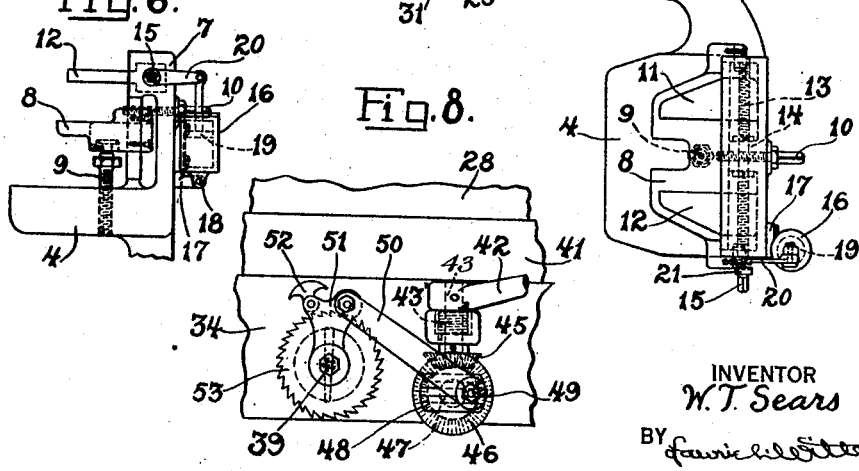
INVENTOR
W. T. Sears
BY
ATTORNEY Patented Jan. 27, 1925.

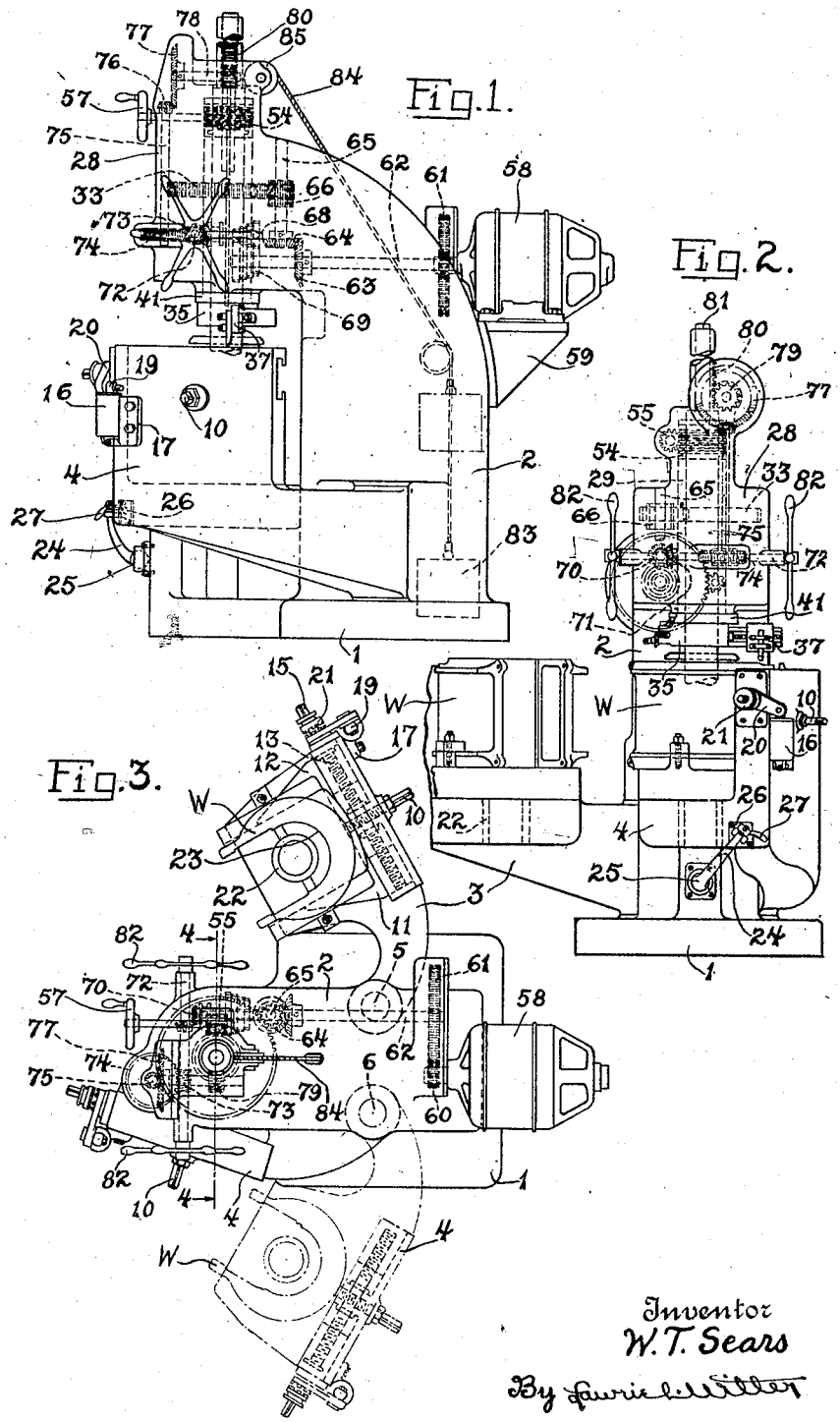

1,524,528

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

BORING AND FACING MACHINE.

Application filed September 23, 1922. Serial No. 590,111.

*To all whom it may concern:*

Be it known that I, WILLARD T. SEARS, a citizen of the United States, residing at Montclair, in the county of Essex and State of New Jersey, have invented certain new and useful Improvements in Boring and Facing Machines, of which the following is a specification.

This invention relates to metal working machines and particularly to a boring and facing machine of the type illustrated in the accompanying drawings. The primary object of the invention is to provide an improved machine of such type, the improvements residing particularly in a novel combined arrangement of work and tool supports.

It is an object of the invention to provide, in a machine of the type illustrated, a pair of work supports preferably pivoted to the column of the machine and movable about such pivots into and out of operative position, the arrangement being such that while one support is in the operative position with the work thereon being operated upon by the tools, the other support is in a position remote from the tool spindle wherein the finished work piece may be removed therefrom and another work piece secured thereto ready for the next tooling operation.

It is another object of the invention to provide a boring machine having an axially movable boring bar and a cooperating work support adapted to be moved into and out of operative position, the work support being provided with a bearing adapted to receive and support the free end of the boring bar when the work support is in the operative position.

Another object of the invention is to provide in the machine defined, a work holder comprising means for accurately positioning a piece of work thereon, such means including a vertically adjustable work supporting bracket, a laterally adjustable element to be engaged by the work piece, and a pair of clamping jaws above the bracket for clamping the work in the operative position, the vertical adjustment of the bracket being adapted to properly position the top surface of the work piece for the tooling operation and the said adjustable element and clamping jaws being adapted to position the work laterally.

A further object of the invention is to provide a boring and facing machine comprising a boring bar mounted within a sleeve carrying a facing tool and means provided in combination therewith for adjusting the sleeve axially and for automatically feeding the boring bar axially and the facing tool radially.

With the above and other objects in view, my invention consists in the features of construction and operation set forth in the following specification and illustrated in the accompanying drawings. In such drawings annexed hereto and forming a part of this specification, I have shown my invention embodied in a locomotive driving box boring and facing machine but it will be understood that the invention can be otherwise embodied and that the drawings are not to be construed as defining or limiting the scope of the invention, the claims appended to this specification being relied upon for that purpose.

Referring to the figures of the drawings:

Figure 1 is a side elevation of the complete machine.

Fig. 2 is a front view thereof.

Fig. 3 is a plan view.

Fig. 4 is an enlarged view of the boring bar and facing tool mechanism, partially in section on line 4—4 of Fig. 3.

Fig. 5 is a cross sectional view thereof on line 5—5 of Fig. 4.

Fig. 6 is an elevation of one of the work supports and its work positioning and clamping means.

Fig. 7 is a plan view thereof.

Fig. 8 is a detail of the feeding mechanism for the facing tool shown in Figs. 4 and 5.

In the accompanying drawings, I have illustrated my invention as embodied in a machine for boring and facing a particular form of work piece, namely, a driving box such as is generally used on railroad locomotives. It will be understood, however, that the invention is in no manner to be limited by such illustration. Among other operations to be performed upon these work pieces, are the boring out of a semi-cylindrical interior portion of the box and the facing off of an end thereof. My invention contemplates improved means for performing these operations simultaneously. Furthermore, my invention contemplates means, including a plurality of work supports, whereby during the tooling operation of a piece of work on one support, a finished work piece may be removed and a rough piece secured to the other work support preparatory to the next tooling operation.

Referring more specifically to the drawings by reference characters, 1 indicates the base and 2 the column of a vertical boring machine embodying my improvements. Work supports 3 and 4 are respectively mounted on opposite sides of the column and preferably pivoted thereto at 5 and 6 as illustrated. Each such support is adapted to be swung horizontally about its pivot into an operative position beneath the tool spindle, hereinafter described, or to an inoperative position remote from the spindle. In Fig. 3, the work support 3 is shown in the inoperative position and the work support 4 is shown in the operative position in full lines and in the inoperative position in dot and dash lines. It should be understood that the term "horizontally" as herein used, in referring to the swinging movement of the work supports, is not to be construed in its strict sense, as the invention is in no manner limited to a movement of the work supports in a horizontal plane.

As shown in Figs. 6 and 7, each work support comprises an upright 7 on which a bracket 8 is slidably mounted. A screw 9 serves to adjust the bracket vertically. Extending through the rear wall of each work support is a horizontal screw 10. This screw acts as a stop when positioning the work piece on the support as hereinafter described. Above the bracket 8 and on the upright 7 are slidably mounted a pair of work clamping jaws 11 and 12. A right and left hand threaded screw 13, journaled at its center in a lug 14, serves to move the jaws horizontally toward and from each other. The screw is provided with a squared end 15 for receiving a handle to manually operate the same. Fluid pressure means is also provided for operating the screw in tightening the jaws on the work. This means comprises a cylinder 16 pivoted to a bracket 17 at 18 and a piston 19 operative in the cylinder and connected to the free end of an arm 20 loose on the screw. A clutch 21 is provided on the screw for operatively connecting the arm to the screw. Each work support is furthermore provided with a bearing 22 for receiving and supporting the free end of the boring bar, such operation being particularly desirable during the finish boring of a work piece.

The operations to be performed on the work piece W comprises the boring out of the semi-cylindrical interior portion 23 and the facing off of the upper end of such piece. Therefore, before beginning such operations, the work piece must be very accurately mounted and clamped in the work support. The vertical position of the work piece when in the support depends upon the vertical position of the bracket 8. The bracket is therefore first accurately adjusted by means of the screw 9. The lateral position of the work piece depends on screw 10 and the jaws 11 and 12. The jaws 11 and 12 automatically accurately center the work laterally in the direction of their movements since such jaws always move simultaneously toward and from each other at the same speed. The lateral position of the work piece in the other direction depends on the position of the screw 10 which screw is adjusted and then locked in a position to properly locate the work piece in such direction. Therefore with the screws 9 and 10 properly adjusted, a work piece inserted into the work holder against the bracket 8 and screw 10 will be properly positioned when the jaws 11 and 12 are clamped thereon. It should be understood that the clamping operation is performed by admitting fluid pressure into cylinder 16 to raise the arm 20, the clutch 21 being closed except when it is desired to adjust the jaws by hand.

Means is provided in connection with the work supports and column for securing either work support in the operative tooling position. This means, as illustrated in Figs. 1 and 2, comprises a bolt 24 universally mounted in the column at 25. Each work support is provided with a slotted plate 26 adjacent its free end to receive this bolt. It will be noted that the bolt may be swung in either direction about the joint 25 to engage the slotted plate 26 of the work support which is in the operative position. By tightening the nut 27, the work support is securely clamped in such operative position.

The column 2 has a portion 28 extending over the free ends of the work supports when they are in their forward operative position. A sleeve 29 is rotatably mounted in this portion of the column. Within the sleeve and preferably splined therein by a key 30 is a boring bar 31 carrying boring tools 32 adjacent the lower end thereof. The sleeve and bar are rotated from a gear 33 on the sleeve as hereinafter described.

On the lower end of the sleeve is a tool head 34 provided with an arm 35 having ways 36 upon which a tool block 37 may be moved in a direction at right angles to the axis of the sleeve. The block 37 is adapted to carry a facing tool 38 as illustrated. A screw 39 journaled in the arm and threadedly engaging a nut 40 in the block provides a means for moving the block along the ways. Further means hereinafter described is provided in connection with the screw for automatically feeding the tool radially as the sleeve is rotated. It will be noted that while the term "radially" is used throughout this specification in referring to the movements of the tool block 37 along the arm 35, such movement, while being toward and from the axis of sleeve 29 as illustrated in Fig. 4 of the drawings, is not exactly radial, the term being used in a loose sense and with the intention of receiving a liberal interpretation.

The automatic means for feeding the tool along the ways 36 comprises an eccentric cam 41 rigidly secured to the over-hanging portion 28 of the column. An arm 42 mounted on a shaft 43 journaled to the head 34 has a roller 44 at its free end bearing on the cam 41. A spring 43¹ surrounding the shaft 43 normally holds the roller 44 in contact with the cam. A bevel gear 45 on the other end of shaft 43 meshes with a bevel gear 46 on a shaft 47. This shaft 47 carries a slotted crank plate 48 within which is adjustably mounted a crank pin 49 on one end of a link 50. The other end of link 50 is connected to an arm 51 loosely mounted on the screw 39. This arm carries a pawl 52 adapted to engage a ratchet wheel 53 secured to the screw. In operation, the roller rides around the eccentric cam 41 as the sleeve 29 and head 34 rotate. The eccentric portion of the cam oscillates the arm 42 whereby the arm 51 and its pawl 52 are intermittently moved back and forth to intermittently rotate the screw 39 through the ratchet 53, the tool thereby being given one feeding movement along the ways 36 for each rotation of the sleeve.

Means is preferably provided for adjusting the sleeve 39 axially. As shown in Fig. 4 the sleeve is rotatably supported by a bushing 54 at its upper end. This bushing has circumferential rack grooves provided therein engaging with the teeth of a rack pinion 55 on a shaft 56. This shaft is journaled in the portion 28 of the column and has a hand wheel 57 at its outer end whereby the shaft and pinion may be rotated to adjust the sleeve axially. It should be understood that this adjustment is to move the facing tool 38 toward and from the work and such adjustment is always very slight.

The sleeve and boring bar are rotated from a motor 58 mounted on a bracket 59. A pinion 60 on the motor shaft meshes with a gear 61 on a shaft 62. A bevel gear 63 on this shaft meshes with a bevel gear 64 on a vertical shaft 65 carrying an elongated pinion 66 in mesh with the aforesaid gear 33 keyed to the sleeve. It will be noted that the gear 33 is mounted in an opening 67 in the portion 28 of the column and that such opening is of sufficient size to permit the said slight vertical adjustment of the sleeve.

The boring bar 31 is splined for rotation with and longitudinal movement through the sleeve 29. Means for feeding the boring bar axially as the same is rotated is provided, as follows: A shaft 68 is driven at any one of a plurality of speeds from the horizontal shaft 62 through change gears 69. A bevel pinion 70 on the shaft 68 meshes with a bevel pinion 71 on a horizontal shaft 72. A worm 73 on shaft 72 meshes with a worm wheel 74 on the lower end of a vertical shaft 75. A bevel pinion 76 on the upper end of shaft 75 meshes with a bevel gear 77 on a rack pinion shaft 78. This shaft 78 carries a rack pinion 79 meshing with a rack 80 journaled to a reduced extension 81 of the boring bar. It will therefore be seen that, as the sleeve and boring bar are rotated, the boring bar may be automatically fed axially at any one of a plurality of speeds. The horizontal shaft 72 is also provided with capstans 82 at its ends whereby the boring bar may be moved axially by hand when desired. It will furthermore be noted that the boring bar is counterbalanced by means of a counterweight 83 in the column secured to a cable 84 passing over a pulley 85 at the top of the column.

It is believed that the operation of the machine will be clear from the above description. A work piece is accurately clamped in one of the work supports in the manner heretofore described and such work support is then moved to its operative position beneath the boring bar or spindle, the bolt 24 and its nut 27 thereafter being manipulated to securely clamp the work support in the operative tooling position. The sleeve and boring bar are thereafter lowered by hand to bring their tools to an operative position adjacent the work piece. Rotation of the motor thereafter serves through the connections heretofore described to rotate the sleeve and boring bar and to feed the boring bar axially and the facing tool radially at the desired speeds. These operations serve to bore out the semi-cylindrical interior 23 of the work piece and to face off the upper flat end surface thereof. While a work piece is thus being operated upon on one support, the operator may remove the work piece previously finished on the other work support and substitute a rough piece therefor in readiness for the next tooling operation. It will therefore be seen that the machine is kept substantially in continuous operation and that the work pieces are thereby finished with considerable rapidity. It should be understood that ordinarily the boring and facing tools act simultaneously on the work piece to finish the same.

What I claim is:

1. In a machine of the class described, the combination of a base, a column thereon, a tool spindle supported for axial movement in the column, a pair of work supports respectively on opposite sides of the column, each of such work supports being horizontally movable to bring the work supported thereon to an operative position relative to the spindle or to a loading position remote from the spindle, means on one side of the column supporting the adjacent work support for such movement, other means on the other side of the column supporting the other work support for such movement, and means for securing the work supports in operative position.

2. In a machine of the class described, the combination of a base, a column thereon, a tool spindle supported for axial movement in the column, a pair of work supports respectively mounted for pivotal movement on opposite sides of the column, each of such work supports being horizontally movable about its pivot to bring work supported thereon to an operative position relative to the spindle or to a loading position remote from the spindle, and means remote from the pivots for securing the work supports in the operative position.

3. In a machine of the class described, the combination of a base, a column thereon, a tool spindle supported for axial movement in the column, a pair of work supports respectively mounted for pivotal movement on opposite sides of the column, each of such work supports being horizontally movable about its pivot to bring work supported thereon to an operative position relative to the spindle or to a loading position remote from the spindle, and means fixed to the column and adapted to engage either work support adjacent its free end for securing the work supports in the operative position.

4. In a machine of the class described, the combination of a base, a column thereon, a tool spindle supported for axial vertical movement in the column, a pair of work supports respectively pivoted to the opposite sides of the column, each of such work supports being horizontally movable about its pivot to a fixed stop on the column to bring work supported thereon to an operative position beneath the spindle and being movable in the opposite direction to a loading position remote from the spindle, and means remote from the pivots for securing the work supports in the operative position.

5. In a boring machine, the combination of a base, a column thereon, a boring bar supported for axial movement in the column, a pair of work supports mounted respectively on opposite sides of the column, each of such work supports being horizontally movable to bring work supported thereon to an operative position relative to the boring bar or to a loading position remote from the boring bar, a bearing in each work support for receiving and supporting the free end of the boring bar, and means for securing each work support in the operative position with its said bearing in alignment with the boring bar.

6. In a boring machine, the combination of a base, a column thereon, a boring bar supported for axial movement in the column, a work support pivotally mounted on the column and movable about such pivot to bring work supported thereon to an operative position relative to the boring bar or to a loading position remote from the bar, a bearing in the work support for receiving the free end of the boring bar, and means for securing the work support in the operative position with the bearing in alignment with the boring bar.

7. In a boring machine, the combination of a base, a column thereon, a boring bar supported for axial movement in the column, a pair of work supports respectively mounted for pivotal movement at opposite sides of the column, each of such work supports being horizontally movable about its pivot to bring work supported thereon to an operative position relative to the boring bar or to a loading position remote from the bar, a bearing in each work support for receiving and supporting the free end of the boring bar, and means for securing either work support in the operative position with its said bearing in alignment with the boring bar.

8. A combined boring and facing mechanism comprising the combination of a support, a sleeve rotatably mounted in the support, a tool holder mounted on the sleeve, a boring bar supported within the sleeve, means for rotating the bar and sleeve, means for automatically feeding the bar axially as the same is rotated, and means for automatically feeding the said tool holder radially as the sleeve is rotated.

9. A combined boring and facing mechanism comprising the combination of a support, a sleeve rotatably mounted in the support, a tool holder mounted on the sleeve, a boring bar within the sleeve, means for adjusting the sleeve axially, means for feeding the boring bar axially, means for rotating the bar and sleeve, and means for automatically feeding the said tool holder radially as the sleeve is rotated.

10. A combined boring and facing mechanism comprising the combination of a support, a sleeve rotatably mounted in the support, a tool holder mounted on the sleeve, a boring bar splined within the sleeve, means for adjusting the sleeve axially, means for rotating the sleeve, the bar being rotated from the sleeve through the said spline, means for automatically feeding the boring bar axially as the same is rotated, and means for automatically feeding the said tool holder radially as the sleeve is rotated.

11. A combined boring and facing mechanism comprising the combination of a support, a sleeve rotatably mounted in the support, a tool holder mounted on the sleeve, a boring bar within the sleeve, means for adjusting the sleeve axially, means for feeding the boring bar axially, means for rotating the bar and sleeve, and means comprising a cam on the support for automatically feeding the said tool holder radially as the sleeve is rotated.

12. In a machine tool, the combination of a support, a rotary element thereon, an outwardly extending tool carrying arm on the element, a facing tool holder on the arm, and means including a cam on the support for intermittently feeding the holder along the arm at each rotation of the element.

13. In a machine tool, the combination of a support, a rotary element thereon, a facing tool holder slidably mounted on an outwardly extending guideway on the element, a screw engaging the holder, and means including a cam on the support and a pawl and ratchet mechanism operatively connected to the screw for intermittently rotating the screw to feed the holder along the guideway at each rotation of the element.

14. In a machine tool, the combination of a support, a rotary element thereon, an outwardly extending tool carrying arm on the element, a facing tool holder slidably mounted on a guideway on the arm, a screw engaging the holder, an eccentric member on the support and surrounding the element, and means operated by the member for intermittently rotating the screw to feed the holder along the guideway at each rotation of the element.

15. A combined boring and facing mechanism comprising the combination of a support, a sleeve rotatably mounted in the support, a boring bar within the sleeve, an arm on the sleeve, a tool holder mounted for sliding movement along the arm, a screw engaging the tool holder, means comprising a pawl and ratchet mechanism and a cam on the support for automatically rotating the screw to intermittently feed the tool holder along the arm as the sleeve is rotated, and means for rotating the sleeve and bar.

16. A metal working machine comprising in combination, a base and a work support thereon, the work support comprising an upright, a work suporting bracket adjustable vertically on the upright, means to adjust the bracket vertically, and means on the work support for positioning the work laterally and securing the same to the support.

17. A metal working machine comprising in combination, a base and a work support thereon, the work support comprising an upright, a work supporting bracket adjustable vertically on the upright, means to adjust the bracket vertically, a pair of jaws above the bracket for engaging opposite sides of the work for positioning the work laterally and securing the same to the support, and screwthreaded means for equally moving said jaws toward and from each other.

18. A metal working machine comprising in combination a base and a work support thereon, the work support comprising an upright, a work supporting bracket adjustable vertically on the upright, means to adjust the bracket vertically, a pair of jaws on the upright above the bracket for engaging opposite sides of the work for positioning the work laterally and securing the same to the support, screw threaded means for equally moving said jaws toward and from each other, and fluid-pressure-operated means for rotating the screw to clamp the work between the jaws.

19. A metal working machine comprising in combination, a base, work supporting means thereon, said means comprising a vertically movable work supporting element, means to adjust the element vertically, adjustable means for positioning the work laterally in one direction, and clamping means operative to adjust the work laterally in a direction at right angles to the said one direction and to secure the work to the work support.

20. A metal working machine comprising in combination, a base, work supporting means thereon, said means comprising a bracket, means to adjust the bracket vertically, adjustable screw means for positioning the work laterally in one direction, a pair of clamping jaws above the bracket and respectively at opposite sides of the said screw means, and means to equally and simultaneously adjust the jaws toward and from each other to position the work laterally in a direction at right angles to the said one direction and to secure the work to the work support.

In testimony whereof, I hereto affix my signature.

WILLARD T. SEARS.